United States Patent [19]

Van Horbek

[11] 4,175,875
[45] * Nov. 27, 1979

[54] HAND MIXING APPARATUS

[76] Inventor: Judd Van Horbek, 575 Sheridan St., Mount Angel, Oreg. 97362

[*] Notice: The portion of the term of this patent subsequent to Oct. 18, 1994, has been disclaimed.

[21] Appl. No.: 859,008

[22] Filed: Dec. 9, 1977

Related U.S. Application Data

[63] Continuation-in-part of Ser. No. 736,711, Oct. 29, 1976, Pat. No. 4,065,107.

[51] Int. Cl.$^2$ ................................................ B01F 7/16
[52] U.S. Cl. ...................................... 366/343; 366/328; 366/605
[58] Field of Search ............... 366/129, 328, 343, 276, 366/605

[56] References Cited

U.S. PATENT DOCUMENTS

| | | | |
|---|---|---|---|
| 318,864 | 5/1885 | Buck | 366/605 X |
| 671,516 | 4/1901 | Hegner | 366/129 X |
| 699,521 | 5/1902 | Heinrichs | 366/276 |
| 861,603 | 7/1907 | Newton | 366/129 X |
| 1,042,948 | 10/1912 | Morisons | 366/328 X |
| 1,281,610 | 10/1918 | Lundahl | 366/129 X |
| 2,546,285 | 3/1951 | Wittmann | 366/276 |
| 3,009,686 | 11/1961 | Kaplan | 366/276 |
| 4,065,107 | 12/1977 | Horbek | 366/328 X |

Primary Examiner—Harvey C. Hornsby
Assistant Examiner—John M. Jillions
Attorney, Agent, or Firm—Warren M. Becker

[57] ABSTRACT

A hand mixing apparatus is described comprising a handle having an upper and a lower section. The upper section is provided for manually rotating the apparatus and may comprise a high-friction surface including a slight bulge. Attached to the lower section there is provided one or more slotted mixing blades. The mixing blades comprise, separately and in combination, straight and angulated rectangular blade elements as well as L-shaped blade elements.

9 Claims, 14 Drawing Figures

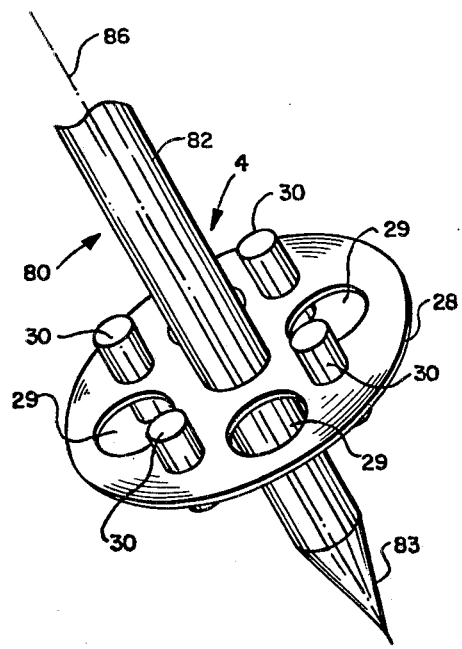
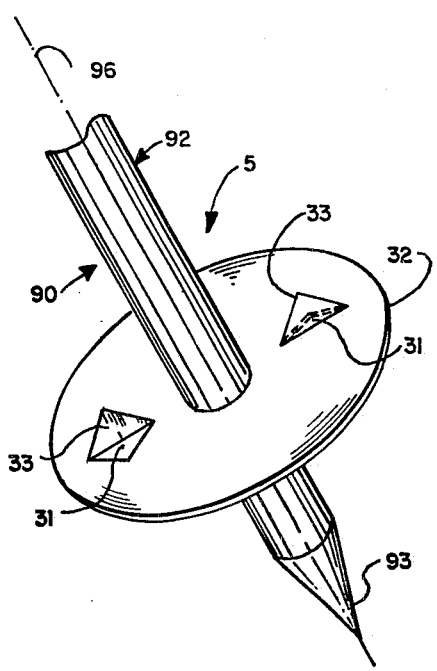
FIG. 5          FIG. 6
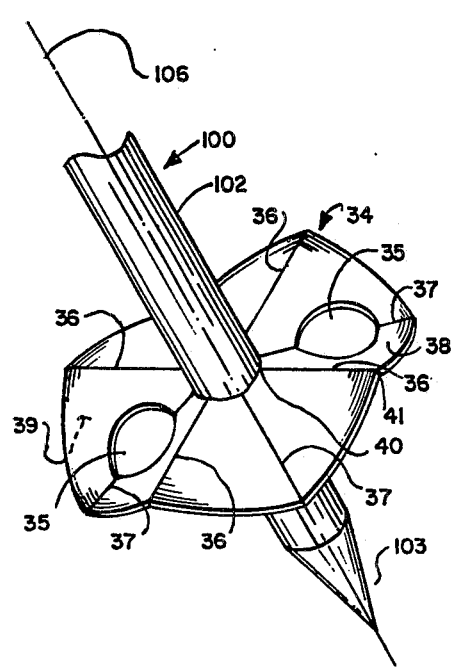
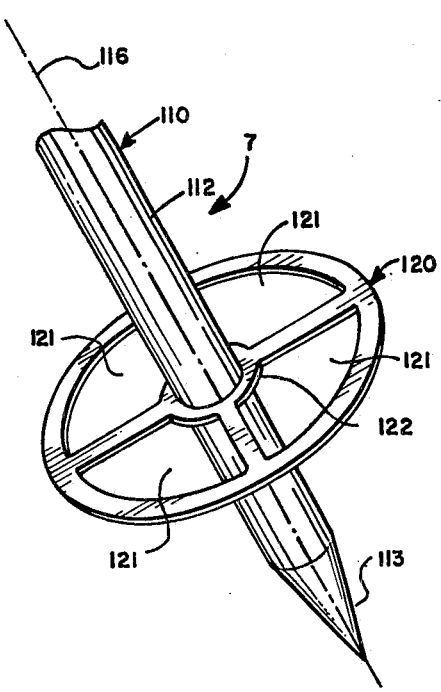
FIG. 7          FIG. 8

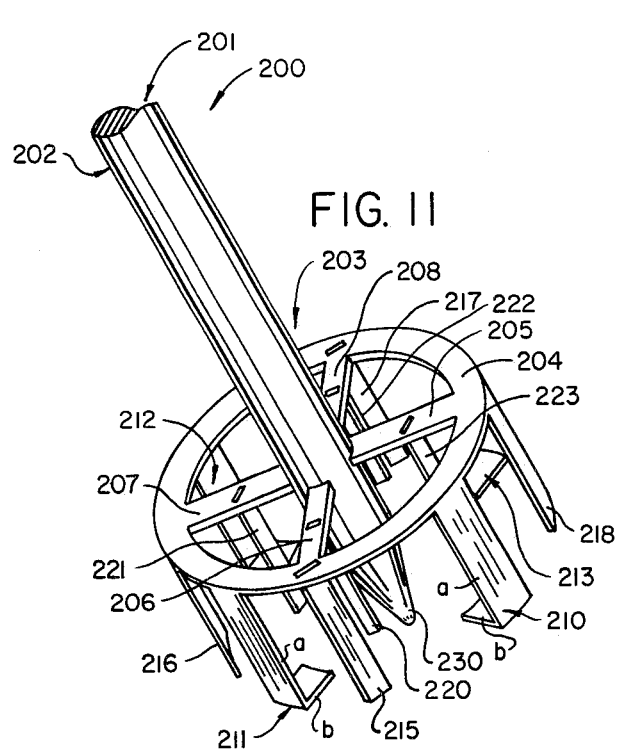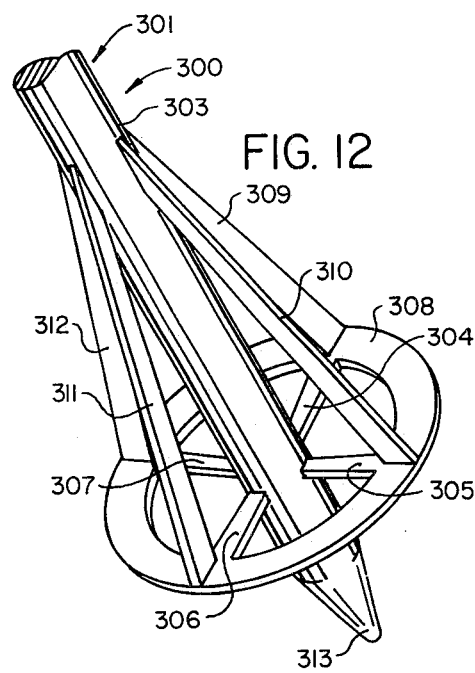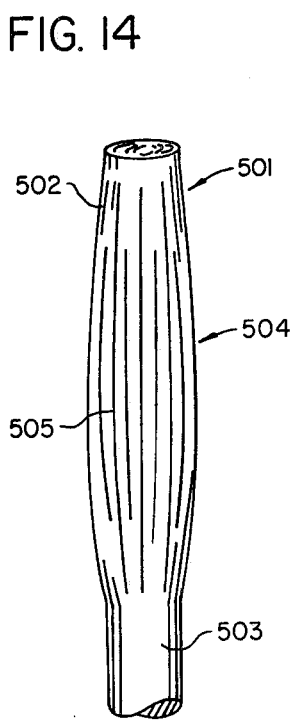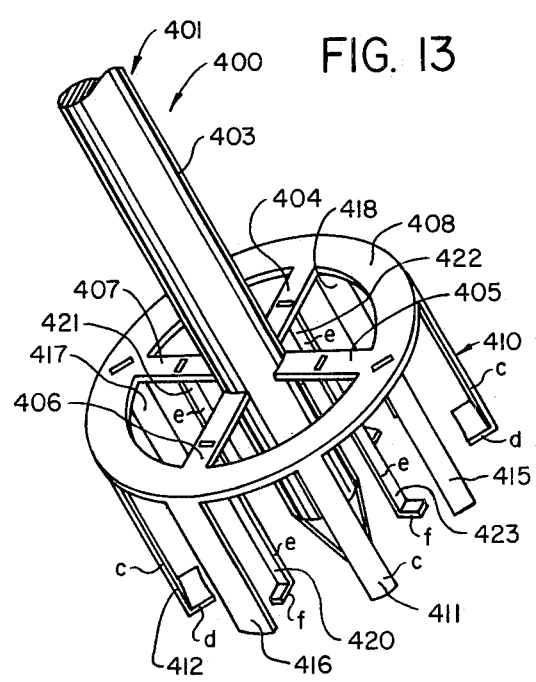

HAND MIXING APPARATUS

RELATED APPLICATION

This is a continuation-in-part of application Ser. No. 736,711, filed Oct. 29, 1976, now U.S. Pat. No. 4,065,107.

BACKGROUND OF THE INVENTION

The present invention relates to an apparatus for mixing liquids. The liquids may be either hot or cold. In particular, this invention is directed to an improved apparatus which reduces the amount of energy required to mix a liquid in a container, such as a bucket or drum. The use of simple paddles or sticks to mix liquids is well known, but is generally laborious and time consuming.

Improvements upon the simple paddle or stick have been made. For example, Lundahl (see U.S. Pat. No. 1,281,610) discloses a paint-mixing tool having a handle and a blade having a specific configuration designed to be rotated between the palms of the user. The blade of Lundahl's tool is designed to mix paint and, in addition, it may be used to open paint cans by cutting the top away and to scrape. The addition of cutting and scraping functions to the mixing blade requires a more rugged design, which increases the weight of the blade, the manufacturing costs and the friction between the bottom of the blade and the bottom of the container in which the mixing is being done.

Another feature of prior known mixing blades is the manner in which the mixture being mixed is moved in a container. Heretofore, most mixing apparatus incline to spin rather than boil the mixtures. This is a disadvantage of the prior known mixing apparatus because it appears that a spinning motion in a mixture presents considerable resistance to mixing while a boiling motion in the mixture offers the least resistance to mixing.

SUMMARY OF THE INVENTION

In view of the foregoing, a principal object of the present invention is a hand-operated mixing apparatus for improved economical mixing of liquids and thick mixtures with a minimum of effort.

In accordance with the above object there is provided, in a number of embodiments of the invention, a handle having an upper and a lower section. The handle may be plain or serrated. It may have a constant and uniform outside diameter or it may have a diameter of increasing magnitude in the center portion thereof for forming a slight bulge corresponding to the concavity formed in the palm of a slightly cupped hand. The slight bulge fitting in the palm of a slightly cupped hand provides a greater surface for imparting rotational motion to the apparatus and increases the comfort of the user. Extending from the lower section, there is provided one or more slotted mixing blades, and terminating the end of the lower section there is provided a pivot point for providing a low-friction bearing surface to support the handle on the bottom of a container and to provide a clearance between the bottom of the mixing blades attached thereto and the container when the apparatus is being held against and rotated on the bottom.

In the embodiments of the invention disclosed herein, and not previously disclosed in the above identified prior patent application, there is provided, attached to the lower section of a handle, a slotted mixing blade comprising an annular ring-shaped blade member and a plurality of individual rectangularly-shaped blade members extending from the ring-shaped member. In some of the embodiments, including the ring-shaped member, there are provided a plurality of rectangularly-shaped blade members extending from the ring-shaped member and supporting cross members. The rectangular shaped blade members comprise both straight and angulated members for improved slicing and mixing. By appropriate positioning of the angulated rectangular mixing blades, a mixture mixed with the apparatus is seen to be characterized by a boiling motion rather than a simple spinning motion. The boiling motion appears to offer the least resistance to blade movement.

The above and other objects, features and advantages of the present invention will become apparent from the following detailed description of the accompanying drawings wherein:

FIG. 5 is a partial side view of a third alternative embodiment of an apparatus for mixing liquids.

FIG. 6 is a partial side view of a fourth alternative embodiment of an apparatus for mixing liquids.

FIG. 7 is a partial side view of a fifth alternative embodiment of an apparatus for mixing liquids.

FIG. 8 is a partial side view of a sixth alternative embodiment of an apparatus for mixing liquids.

FIG. 11 is a partial perspective view of an eighth embodiment of the present invention.

FIG. 12 is a partial perspective view of a ninth embodiment of the present invention.

FIG. 13 is a partial perspective view of a tenth embodiment of the present invention.

FIG. 14 is a perspective view of an alternative handle for the mixing apparatus of FIG. 1–13.

DETAILED DESCRIPTION OF THE INVENTION AND DRAWINGS

Figure 1:
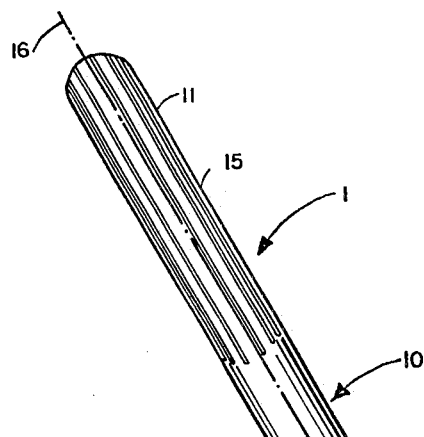
FIG. 1 is a side view of one embodiment of an apparatus for mixing liquids.

Referring to FIG. 1, there is provided in an apparatus 1 for mixing liquids according to the present invention a handle 10 with a longitudinal axis 16 and a slotted mixing blade 20. The handle 10 has an upper portion 11 and a lower portion 12. The upper portion 11 contains grooves 15 which act as a friction surface and aid in rotating the handle by hand. The lower portion 12 of the handle 10 terminates in a conical surface 13, which is concentric with the longitudinal axis 16. The handle 10 has a hollow space 14 which is concentric with the longitudinal axis 16 and sealed to prevent liquids from entering the hollow space 14. The mixing blade 20 is attached perpendicular and parallel to the longitudinal axis 16 on the lower portion 12 of the handle 10 in a conventional manner. The slotted mixing blade 20 is planar and triangular. The slotted mixing blade 20 contains a slot 21 on each side of the handle 10, which reduces the amount of effort required to mix the liquid and improves the mixing ability of the blade 20. The longitudinal axis 16 is a straight line passing through the handle 10. The handle 10 is symmetrically arranged around the longitudinal axis 16.

Figure 2:
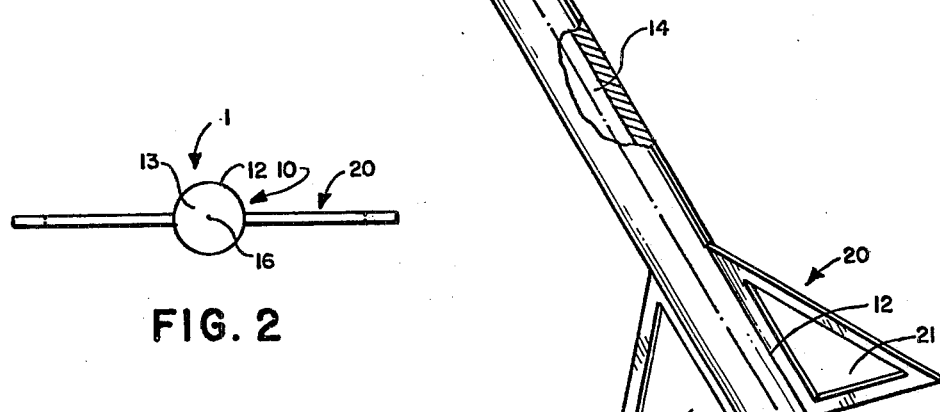
FIG. 2 is a bottom view of the apparatus of FIG. 1.

Referring to FIG. 2, there is provided a bottom view of the apparatus 1 of FIG. 1 showing the handle 10 bisected by the slotted mixing blade 20. The slotted mixing blade 20 is bisected by the handle 10. The handle 10 has a lower portion 12 terminating in a conical surface 13. The slotted mixing blade 20 is attached perpendicular and parallel to the longitudinal axis 16 of the handle 10.

Figure 3:
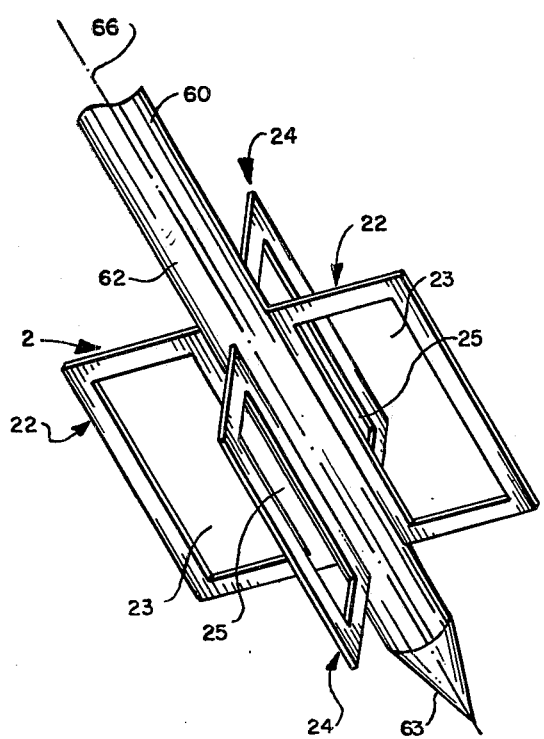
FIG. 3 is a partial side view of a first alternative embodiment of an apparatus for mixing liquids.

Referring to FIG. 3, there is provided, in a partial side view of a second embodiment of an apparatus 2 for mixing liquids, a handle 60 with a longitudinal axis 66, a first slotted mixing blade 22 and a second slotted mixing blade 24. The handle 60 has a lower portion 62. The lower portion 62 terminates in a conical surface 63. The first slotted mixing blade 22 is attached perpendicular and parallel to the longitudinal axis 66 on the lower portion 62 of the handle 60. The second slotted mixing blade 24 is attached perpendicular and parallel to the longitudinal axis 66 of the lower portion 62 of the handle 60. The second slotted mixing blade 24 is perpendicular to the first slotted mixing blade 22. The first slotted mixing blade 22 has a slot 23 on each side of the handle 60. The second slotted mixing blade 24 has a slot 25 on each side of the handle 60. Both slotted mixing blades 22 and 24 are planar and rectangular.

Figure 4:
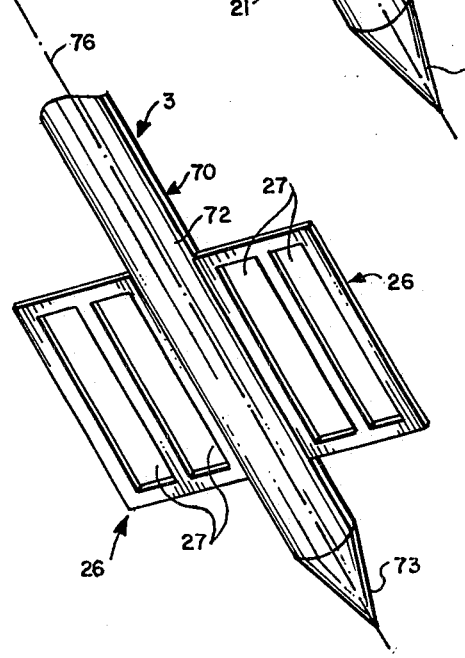
FIG. 4 is a partial side view of a second alternative embodiment of an apparatus for mixing liquids.

Referring to FIG. 4, there is provided, in a partial side view of a third embodiment of an apparatus 3 for mixing liquids, a handle 70 with a longitudinal axis 76 and a slotted mixing blade 26. The handle 70 has lower portion 72. The lower portion 72 terminates in a conical surface 73. The slotted mixing blade 26 is attached perpendicular and parallel to the longitudinal axis 76 on the lower portion 72 of the handle 70. The slotted mixing blade 26 has two parallel slots 27 on each side of the handle 70. The slotted mixing blade 26 is planar and rectangular.

Referring to FIG. 5, there is provided, in a partial side view of a fourth embodiment of an apparatus 4 for mixing liquids, a handle 80 with a longitudinal axis 86 and a slotted mixing blade 28. The lower portion 82 terminates in a conical surface 83. The slotted mixing blade 28 is attached perpendicular and concentric to the longitudinal axis 86 on the lower portion 82 of the handle 80. The slotted mixing blade 28 has four circular slots 29 and four vertical deflectors 30. The four circular slots 29 are equal in size and located every ninety degrees at the same distance from the center of the blade 28. The four vertical deflectors 30 are equal in size, are located every ninety degrees between the four circular slots 29 at the same distance from the center of the blade 28 and extend equally above and below the plane of the blade 28. The slotted mixing blade 28 is circular and planar with deflectors 30 projecting above and below the plane.

Referring to FIG. 6, there is provided, in a partial side view of a fifth embodiment of an apparatus 5 for mixing liquids, a handle 90 with a longitudinal axis 96 and a slotted mixing blade 32. The handle 90 has a lower portion 92. The lower portion 92 terminates in a conical surface 93. The slotted mixing blade 32 is attached perpendicular and concentric to the longitudinal axis 96 on the lower portion 92 of the handle 90. The slotted mixing blade 32 has two triangular slots 31 and two triangular flaps 33. The triangular slots 31 are equal in size and located one hundred and eighty degrees apart at the same distance from the center of the blade 32. The triangular flaps 33 are formed simultaneously with the slots 31 by punching only two sides of the triangular slots 31 and bending the blade material upward at an angle of about fifteen degrees to form the third side of the slots 31 and the flaps 33. The slotted mixing blade 32 is circular and planar with the flaps projecting above the plane.

Referring to Fig. 7, there is provided, in a partial side view of a sixth embodiment of an apparatus 6 for mixing liquids, a handle 100 with a longitudinal axis 106 and a slotted mixing blade 34. The handle 100 has a lower portion 102. The lower portion 102 terminates in a conical surface 103. The slotted mixing blade 34 is attached perpendicular and concentric to the longitudinal axis 106 on the lower portion 102 of the handle 100. The slotted mixing blade 34 has two equal, circular slots 35 located one hundred and eighty degrees apart at the same distance from the center of the blade 34. The slotted mixing blade 34 is corrugated by eight radial bends which alternate between up and down. The upward radial bends 36 extend from the center 40 of the blade 34 to the perimeter 41 with their ridge or peak extending along the upper surface 38 of the blade 34. The downward radial bends 37 extend from the center 40 of the blade 34 to the perimeter 41, with their valley or trough extending along the lower surface 39 of the blade 34. The upward radial bends 36 alternate with the downward radial bends 37 around the entire blade at intervals of forty-five degrees.

Referring to FIG. 8, there is provided, as shown in a partial side view, in a seventh embodiment of the invention, an apparatus 7, for mixing liquids, comprising a handle 110 with a longitudinal axis 116, a lower portion 112 terminating in a conical surface 113, and a slotted mixing blade 120. The slotted mixing blade 120 is circular and planar and is attached perpendicular and concentric to the longitudinal axis 116 on the lower portion 112 of the handle 110. The slotted mixing blade 120 has a central hub 122 and a plurality of slots 121, the slots 121 being equal in size and located every ninety degrees at the same distance from the central hub 122. There are four slots in this embodiment.

Figure 9:
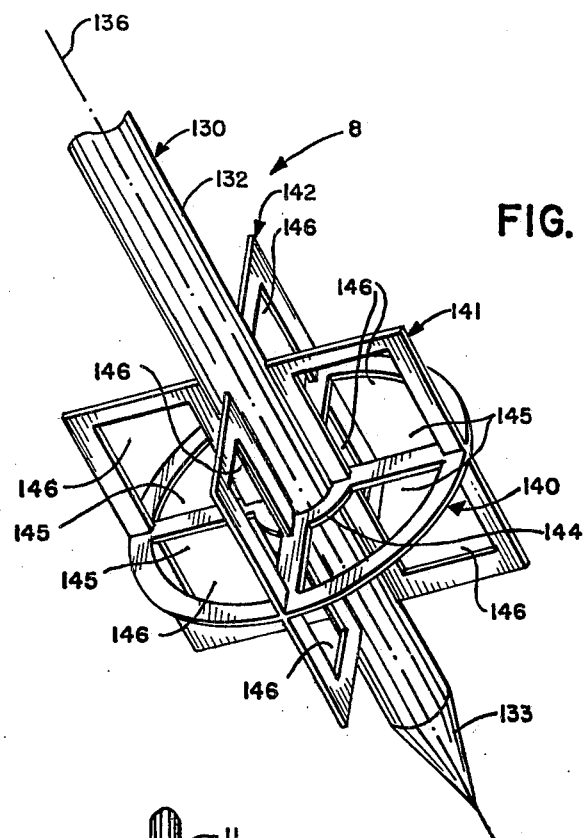
FIG. 9 is a partial side view of a seventh alternative embodiment of an apparatus for mixing liquids.

Referring to FIG. 9, there is provided, as shown in a partial side view, in an eighth embodiment of the invention, an apparatus 8 for mixing liquids, having a handle 130 with a longitudinal axis 136, a lower portion 132 terminating in a conical surface 133, and a plurality of slotted mixing blades 140, 141 and 142. The slotted mixing blade 140 is circular and planar and is attached perpendicular and concentric to the longitudinal axis 136 on the lower portion 132 of the handle 130 and has a central hub 144 and a plurality of slots 145. The slots 145 are equal in size, located every ninety degrees and are at the same distance from the central hub 144. The slotted mixing blades 141 and 142 are attached perpendicular and parallel to the longitudinal axis 136 on the lower portion 132 of the handle 130, are planar and rectangular in shape, and have a plurality of slots 146 on each side of the handle 130. The slots 146 are rectangular and equal in size and located at the same distance from the handle 130. The slotted mixing blades 141 and 142 are bisected by the first slotted mixing blade 140 at their midpoint, the slotted mixing blade 140 forming an outer circular ring. There are eight slots in the slotted mixing blades 141 and 142 and four slots in the first slotted mixing blade 140.

Figure 10:
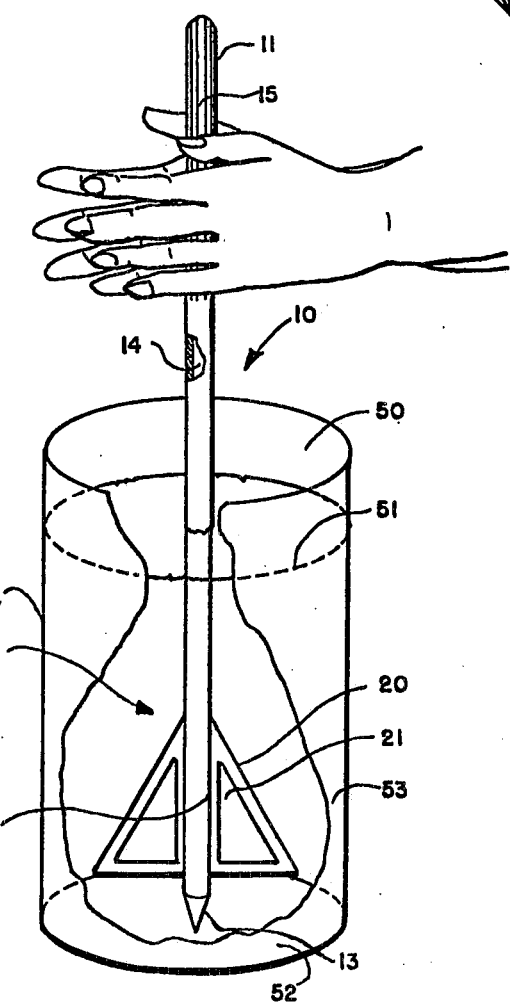
FIG. 10 is a side view of the apparatus of FIG. 1 being used to mix a liquid by hand.

Referring now to FIG. 10, the apparatus 1 is shown mixing a liquid 53 in an open container 54. The apparatus 1 is inserted through the opening 50 of the container and into the liquid 53 until the conical surface 13 of the lower portion 12 of the handle 10 rests on the bottom 52 of the container 54. The hands of the user are placed on the upper portion 11 of the handle 10 where the friction surface 15 enables the user to rapidly and easily rotate the apparatus 1. The mixing blade 20 should be kept under the surface 51 of the liquid 53 to maximize mixing and minimize splattering. The hollow space 14 gives buoyance to the apparatus 1.

The handle is adapted to the general size of the containers in which the apparatus is to be used. The handle may be hollow or solid. The hollow handle reduces the weight of the apparatus, requires less material when constructed of either a metal or plastic and provides buoyance. When the handle is hollow, it is sealed to prevent any liquid being mixed from entering the hollow space of the handle. The handle may be made out of any suitable material, including wood, metal or plastic.

A cross section of the handle perpendicular to the longitudinal axis is generally circular, but may be oval, triangular, square or rectangular. Generally the upper portion of the handle is circular in cross section, having a diameter of from about ¼ to 2 inches. The friction surface is produced in a conventional manner and may be grooved, checkered, dimpled or roughened. When the cross section of the lower portion of the handle is non-circular, it may aid in the mixing of the liquid in the container. The handle generally has a uniform, circular cross section the entire length of the handle. The hollow space is generally circular in cross section, resulting in a cylindrical handle when the cross section of the handle is also circular.

The lower portion of the handle has the slotted mixing blades attached thereto. The slotted mixing blades may be attached in either a temporary or a permanent manner, preferably permanent. When the handle is hollow, the slotted mixing blades should be sealed to the lower portion of the handle to prevent the liquid from entering the hollow space. If the handle is solid, sealing is not required. The lower portion terminates in a salient surface. The salient surface reduces the amount of friction between the terminal end of the lower portion of the handle and the surface at the bottom of the container. The salient surface may be either convex or conical. When the salient surface is conical, the angle of the cone is not critical, and is generally between fifteen degrees and one hundred and sixty-five degrees. A convex surface is formed by taking an exterior section of a sphere, generally a hemisphere or less.

The slotted mixing blade may be rotated about its plane or one of its major axes, or a combination thereof. The slotted mixing blade which is bisected by the handle may be one piece or two pieces. One or more blades may be attached either perpendicular and parallel to the lower portion of the handle or perpendicular and concentric to the lower portion of the handle. The overall size of the blade is limited by the size of the opening of the container to be used for mixing the liquid. The mixing blade may be made out of any material compatible with the liquid being mixed. Generally the blades are made from metal, plastic or plastic-coated metal. The overall shape of the blades is not critical, and ease of manufacture is a factor in arriving at the final shape.

The shape of the slots in the mixing blade is not critical, and may be of any shape which is readily produced in the manufacture of the blade. The number of slots is not critical and generally is two or more arranged symmetrically so that the blade is in balance. The slots are entirely within the blade and do not communicate with the edge of the blade. These slots may be called inner or internal slots.

The deflectors or flaps may be raised portions of the mixing blade produced by molding or stamping in the manufacturing process for producing the mixing blade, or may be separate parts attached to the mixing blade at some point in the manufacturing process. The number of deflectors or flaps is not critical and generally is two or more arranged so that the blade is in balance. The method of attaching the deflectors or flaps to the circular mixing blade is not critical. The deflectors or flaps may be attached to the upper surface, the lower surface, both surfaces or may extend from the upper surface through the blade to the lower surface of the blade.

The combination of slots and/or deflectors and flaps need not be balanced when the apparatus is used for hand mixing. For power mixing, the apparatus and blade should be balanced. The balancing of the apparatus and blade minimizes the wear and/or damage to the apparatus, blade and power source, caused by the fluctuating load generated by the unbalanced mixing blade and/or apparatus.

The apparatus 1 is used by placing the lower portion 12 of the apparatus containing the mixing blade 20 through the opening 50 of the container 54 and resting the conical surface 13 on the bottom of the container 52 as shown in FIG. 10. The mixing blade is preferably below the surface of the liquid 51 to maximize mixing and minimize splashing of the liquid 53 out of the container 54. The apparatus is rotated about its longitudinal axis 16 to mix the liquid 53. The rotation may be done by hand, as illustrated in FIG. 10, where friction surface 51 of the upper portion 11 of the handle 10 is rotated between the hands. The apparatus 1 may also be rotated by a power source, such as an electric motor connected to the handle in a conventional manner. When a power source is employed, the diameter of the handle may be greater than that used for hand rotation to give the apparatus greater strength or the apparatus may be constructed from materials having greater strength than the apparatus designed to be hand powered. Similarly, apparatus 2, 3, 4, 5, 6, 7 and 8 may be used in the same manner as apparatus 1. The upper portion of the handles of apparatus 2, 3, 4, 5, 6, 7 and 8 were not illustrated in FIGS. 3, 4, 5, 6, 7, 8 and 9 since they were the same as the upper portion of the handle of apparatus 1, illustrated in FIGS. 1, 2 and 10.

Referring to FIG. 11, there is shown in another embodiment of the present invention a mixing apparatus designated generally as 200. In mixing apparatus 200, there is provided a handle designated generally as 201 having an upper section 202 (only part of which is shown) and a lower section 203. Fitted to the lower section 203 there is provided an annular ring-shaped mixing blade member 204. Ring-shaped blade 204 is supported concentrically about the handle 201 by four radially extending blade members 205, 206, 207 and 208. Depending downwardly from the ring-shaped blade member 204, there are provided four L-shaped blade members 210, 211, 212 and 213. Each of the L-shaped blade members 210–213 comprises a first section A extending from and perpendicular to the plane of the ring-shaped mixing blade 204 and a second section B extending inwardly from and perpendicular to the end of the first section A. Intermediate the L-shaped blades 210–213 there are provided a plurality of straight blade members 215, 216, 217 and 218. The blade members 215 and 217 extend from the ring-shaped member 204 with the plane of the blades disposed at an angle approximately 20° relative to the path of travel of the blade when the apparatus is rotated. The plane of the blades 216 and 218 is disposed parallel to the path of travel of the blade when the apparatus is rotated.

Interior of the blades 215–218, and depending downwardly from the radially extending supporting members 206, 207, 208 and 205, respectively, there are provided a plurality of rectangularly-shaped blade members 220, 221, 222 and 223. The blade members 221 and 223 are mounted to the supporting members 207 and 205 with the plane of the blades being disposed at an angle of 45° relative to the path of travel of the blade when the apparatus is rotated. The blades 220 and 222 depend from the radially extending supporting members 206 and 208 with the plane of the blades parallel to the path of travel of the blades when the apparatus is rotated.

At the lower end of the lower section of the handle 201 there is provided a pivot point or conical salient surface 230. The pivot point 230 is provided for providing a lowfriction bearing surface to support the handle on the bottom of the container and to provide a clearance between the bottom of the mixing blades attached thereto and the bottom of the container when the apparatus is being held against and rotated on the bottom.

Referring to FIG. 12, there is provided, in another embodiment of the present invention, a mixing apparatus 300 comprising a handle 301 having a lower section 303. Attached to the lower section 303 in a plane perpendicular to the axis of the handle 301 by means of four radially extending supporting mixing blades 304, 305, 306 and 307 there is provided an annular ring-shaped mixing blade 308. Ring-shaped mixing blade 308 is mounted concentrically about the handle 301. Extending from the top of the mixing blade 308 there are provided a plurality of mixing blades 309, 310, 311 and 312. Each of the blades 309–312 extends from the blade 308 upwardly and inwardly and are attached to the lower section 303 of the handle 301 above the plane of the ring-shaped mixing blade 308. At its lower end, the handle 301 is terminated by a conically-shaped pivot point 313. Pivot point 313 is provided for providing a low friction bearing surface to support the handle 301 on the bottom of the container and to provide a clearance between the bottom of the mixing blades attached thereto and the bottom of the container when the apparatus is being held against and rotated on the bottom.

Referring to FIG. 13, there is provided another embodiment of the present invention comprising a mixing apparatus designated generally as 400. In apparatus 400, there is provided a handle designated generally as 401 having a lower section 403 similar in structure and function to the sections 203 and 303 of the embodiments of FIGS. 11 and 12. Fitted to the lower section 403 and extending radially therefrom are a plurality of radially extending supporting blades 404, 405, 406 and 407 supporting a ring-shaped mixing blade 408 concentrically about the handle 401. Downwardly depending from the ring-shaped mixing blade 408, and perpendicular to the plane thereof there are provided a plurality of L-shaped mixing blades 410, 411 and 412. A fourth L-shaped mixing blade depending from the ring 408 on the side opposite the blade 411 is also provided but not shown. Each of the blades 410, 411 and 412 is provided with a first section C extending from and perpendicular to the plane of the ring-shaped mixing blade 408 and a second section D extending inwardly from and perpendicular to the end of the first section C. Between each of the blades 410, 411 and 412 and the L-shaped blade (not shown) opposite the blade 411, there is provided a plurality of rectangular blades 415, 416, 417, and 418. Each of the blades 415–418 extends from and is perpendicular to the plane of the ring-shaped mixing blade 408 and the plane of the supporting mixing blades 404–407 with the plane of the blades 416 and 418 being disposed parallel to the path of travel of the blades when the apparatus is rotated and the plane of the blades 415 and 417 being disposed at an angle as of 20 degrees to the path of travel of the blades when the apparatus is rotated. Interior of the blades 415–418 there are provided a plurality of L-shaped blades 420, 421, 422 and 423. Each of the L-shaped blades 420–423 is provided with a first section E extending from and perpendicular to the plane of the respective supporting member to which it is attached and a second section F extending outwardly from and perpendicular to the end of the first section E. At the end of the lower section 403 of the handle 401 there is provided a pivot point terminating the lower section for providing a low-friction bearing surface to support the handle on the bottom of the container and to provide a clearance between the bottom of the mixing blades attached thereto and the bottom of the container when the apparatus is being held against and rotated on the bottom.

Referring to FIG. 14, there is provided an alternative handle 501 having an upper section 502 and a lower section 503. The upper section 501 corresponds to the upper section 202 of the handle 201 of FIG. 11 and the upper section 11 of the handle of the embodiment of FIG. 1. The lower section 503 corresponds to the lower sections of the handles of FIGS. 1–14 as described above. Intermediate the ends of the upper section 501 there is provided a bulging portion 504 having a uniformly curved surface extending uniformly about the upper section 501 and terminating at both ends with a smaller diameter corresponding to the diameter of the lower section 503. The bulging portion 504 is further provided with serrations, grooves or the like 505 for providing a friction surface to facilitate rotation of the handle and mixing apparatus at the bottom thereof. In alternative embodiments, in lieu of serrations, grooves and the like, the bulging portion 504 may be provided with a rubber-like surface or the like for providing the necessary or desired friction. Generally, the size and shape of the bulging portion 504 corresponds to the concavity formed in the palms of a user's hands when the hands are slightly cupped as they are when they are used for rotating the mixing apparatus therebetween. In addition to the bulging surface 504, the handle 501 is preferably hollow for providing the buoyancy described above with respect to the embodiment of FIG. 1.

Each of the embodiments of FIGS. 11, 12 and 13, like the embodiments of FIGS. 1–10, is very effective for manually mixing liquids and thick mixtures such as whipping cream, eggs and the like. The embodiments of FIGS. 11 and 13, however, have a number of very effective features. The L-shaped blades are very effective slicers and mixers and they cover a large mixing area. Four are shown in one embodiment and eight are shown in the other. The straight rectangular blades slice and break up the mixture as do the L-shaped blades, but cover less area. Both the L-shaped blades and the straight rectangular blades are found to slip relatively easily through a mixture.

As shown and described with respect to FIGS. 11 and 13, certain ones of the straight rectangular blades are disposed at an angle relative to their respective path of travel as the apparatus is rotated. The angled blades makes the mixing of thin mixtures quick and easy. The presence of the angled as well as straight blades creates a boiling motion in a mixture which is found to be the best mixing motion. When the blades are placed in different positions the mixture seems inclined to spin rather than boil. In practice, it is found that the boiling motion increases the mixing action while, at the same time, reducing the resistance to the mixing operation.

In a typical embodiment, the length of the sections A, C and E of the L-shaped members in the embodiments of FIGS. 11 and 13, may range from ½ to one and ¼ inches. The length of the lower sections B, D and F may range from ½ to ¾ of an inch. The widths are typically ¼ inch to ⅜ inches and the thickness of the members is 3/32 to ⅛ inch. The rectangular blades are from ½ to 11/4 inches in length, ¼ to ⅜ inches in width and from 3/32 to ⅛ inches thick. The angle which certain of the rectangular blades make with respect to their path of travel is preferably as described above with respect to the embodiment of FIGS. 11 and 13. The radially extending supporting members 205-208 of the apparatus of FIG. 11, 304-307 of the apparatus of FIG. 12 and 404-407 of the apparatus of FIG. 13 and the ring-shaped blades 204, 308 and 408 are typically ¼ to ⅜ inches wide and 3/32 to ⅛ inch thick. The diameter of the ring-shaped blade 204, 308 and 408 is between 2 and 3 inches. The other features of the embodiment of FIG. 12 are comparably sized. The handle is typically from ¼ inch to one inch in diameter depending upon the volume of matter to be mixed. The material from which the mixing apparatus is made may be plastic or metal but obviously should be compatible with the matter being mixed.

While there have been described and pointed out the fundamental features of the invention as applied to the preferred embodiments, those skilled in the art will appreciate that various changes, modifications and omissions from the apparatus may be made without departing from the spirit of the invention. It is the intention, therefore, that the invention be limited only by the scope of the claims which follow.

What is claimed is:

1. An apparatus for mixing comprising:
   a handle having an upper section and a lower section;
   a pivot point terminating the lower section for providing a low-friction bearing surface to support the handle on the bottom of a container and to provide a clearance between the bottom of mixing blades attached thereto and the bottom of the container when the apparatus is being held against and rotated on the bottom;
   a circular ring-shaped mixing blade;
   a plurality of supporting mixing blades rigidly attached to and extending radially in a plane perpendicular to the axis of the handle from the lower section of the handle to the interior edge of the ring-shaped mixing blade for supporting the ring-shaped mixing blade concentrically about the lower section of the handle; and
   a plurality of mixing blades which extend in planes perpendicular to the plane of the supporting and ring-shaped mixing blades.

2. A mixing apparatus according to claim 1 wherein the plurality of mixing blades which extend in planes perpendicular to the plane of the supporting and ring-shaped mixing blades comprises:
   a plurality of L-shaped mixing blades each having a first section extending perpendicular to the plane of the supporting and ring-shaped mixing blades and a second section extending from and perpendicular to the end of the first section; and
   a plurality of rectangularly-shaped mixing blades extending perpendicular to the plane of the supporting and ring-shaped mixing blades.

3. A mixing apparatus according to claim 2 wherein the planes of selected ones of the rectangularly-shaped mixing blades are disposed at predetermined angles relative to the path of travel of the blades when the apparatus is rotated.

4. A mixing apparatus according to claim 2 wherein the planes of selected ones of the rectangularly-shaped mixing blades are orientated parallel and at first and second predetermined angles relative to the path of travel of the blades when the apparatus is rotated.

5. A mixing apparatus according to claim 4 wherein the first and second predetermined angles are approximately 20 degrees and 45 degrees, respectively.

6. A mixing apparatus according to claim 2 wherein the plurality of rectangularly-shaped mixing blades comprises at least one rectangularly-shaped mixing blade extending from each of the plurality of radially extending supporting mixing blades and a plurality of rectangularly-shaped mixing blades extending from the ring-shaped mixing blade with the plane of selected ones of the blades being disposed at an angle relative to the path of travel of the blade when the apparatus is rotated and with the plane of other ones of the blades being disposed parallel to the path of travel of the blade when the apparatus is rotated.

7. A mixing apparatus according to claim 1 wherein the plurality of mixing blades which extend in planes perpendicular to the plane of the supporting and ring-shaped mixing blades comprises a plurality of upwardly extending mixing blades extending upwardly from the ring-shaped mixing blade at an angle relative to the plane thereof to the handle.

8. A mixing apparatus according to claim 7 wherein each of the upwardly extending mixing blades overlaps one of the plurality of radially extending supporting mixing blades.

9. A mixing apparatus according to claim 1 wherein the upper section of the handle comprises a curved, generally bulbar-shaped surface conforming to the concavity formed between a pair of slightly cupped hands cupped together about the handle when the handle is rotated between the hands by a to-and-fro movement of the hands relative to each other.

* * * * *